United States Patent

Novak et al.

[11] Patent Number: 5,934,681
[45] Date of Patent: *Aug. 10, 1999

[54] EXPANDABLE GASKET AND METHOD OF MAKING SAME

[75] Inventors: Gary J. Novak, Indian Head Park; Mark Adelizzi, Wheeling, both of Ill.

[73] Assignee: Fel-Pro Incorporated, Skokie, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/747,160

[22] Filed: Nov. 8, 1996

[51] Int. Cl.⁶ ........................................ F16J 15/02
[52] U.S. Cl. .................. 277/312; 277/598; 277/630; 277/924
[58] Field of Search ................ 29/415, 416, 425, 29/432, 432.1, 432.2; 264/153, 160; 83/18, 19, 20; 277/312, 313, 592, 593, 598, 630, 650, 924, 939

[56] References Cited

U.S. PATENT DOCUMENTS

| | | |
|---|---|---|
| 1,986,465 | 1/1935 | Dempsey . |
| 2,851,317 | 9/1958 | Greifenstein . |
| 3,175,832 | 3/1965 | Carrell . |
| 3,231,289 | 1/1966 | Carrell . |
| 3,355,181 | 11/1967 | Olson ........................................ 277/180 |
| 3,438,117 | 4/1969 | Engleman . |
| 3,583,711 | 6/1971 | Engleman . |
| 3,738,670 | 6/1973 | Jelinek et al. . |
| 3,766,629 | 10/1973 | Lechtenberg . |
| 4,026,565 | 5/1977 | Jelinek .................................... 277/180 |
| 4,060,015 | 11/1977 | Gros . |
| 4,293,135 | 10/1981 | Wallace . |
| 4,443,018 | 4/1984 | Samol et al. . |
| 4,572,522 | 2/1986 | Smagatz . |
| 4,640,455 | 2/1987 | Grein et al. . |
| 4,653,166 | 3/1987 | Bright . |
| 4,690,413 | 9/1987 | Adkins . |
| 4,712,146 | 12/1987 | Moon et al. . |
| 5,161,808 | 11/1992 | Walters . |
| 5,187,621 | 2/1993 | Tacklind . |
| 5,193,822 | 3/1993 | Bonell et al. . |
| 5,618,047 | 4/1997 | Belter . |
| 5,647,255 | 7/1997 | Stone ........................................ 277/1 |

Primary Examiner—Anthony Knight
Assistant Examiner—John L. Beres
Attorney, Agent, or Firm—Brinks Hofer Gilson & Lione

[57] ABSTRACT

A method of making an expandable metal gasket by forming an expandable core and spreading the core to an open condition with a parallelogram linkage tool, an expandable gasket body, and an expandable gasket precursor. The application also discloses a method of making a semi-rigid gasket having elastomeric bridges holding a series of core segments together.

27 Claims, 5 Drawing Sheets

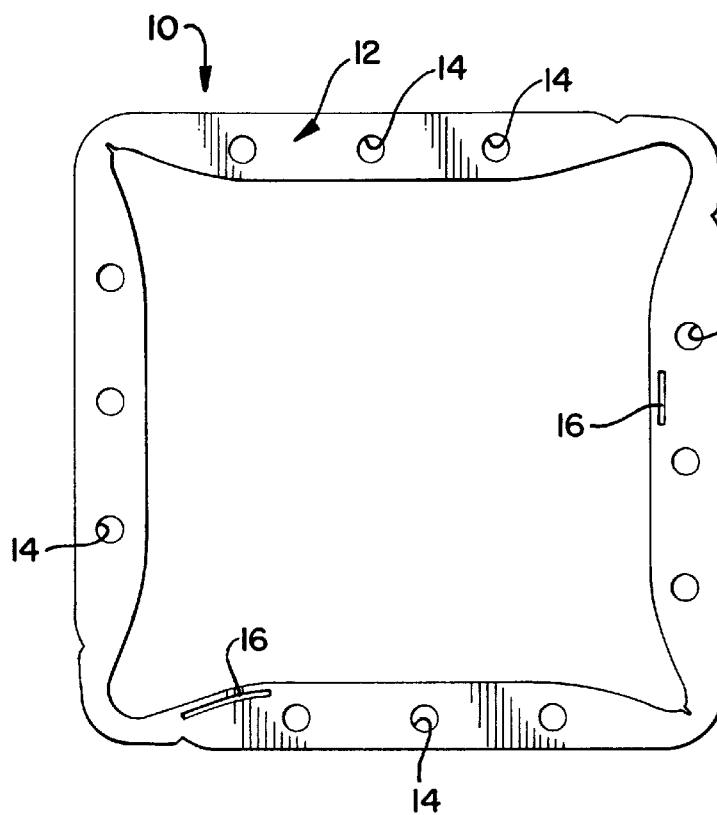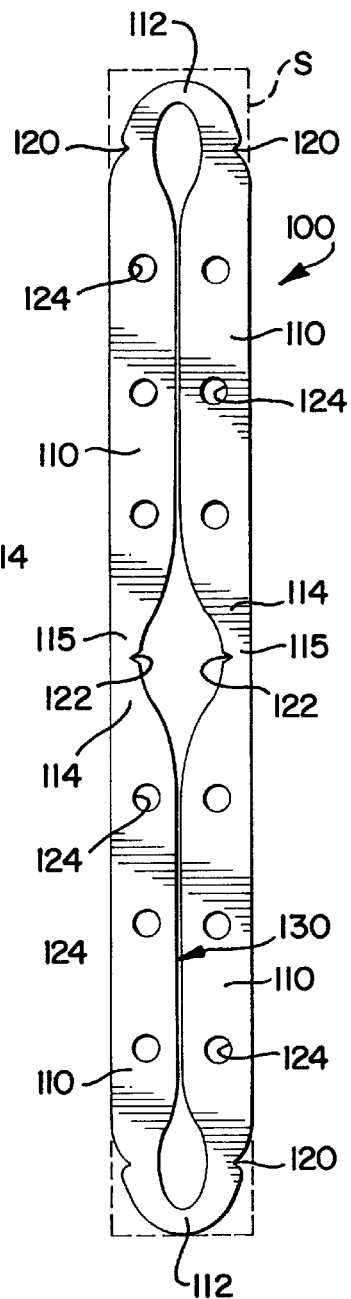

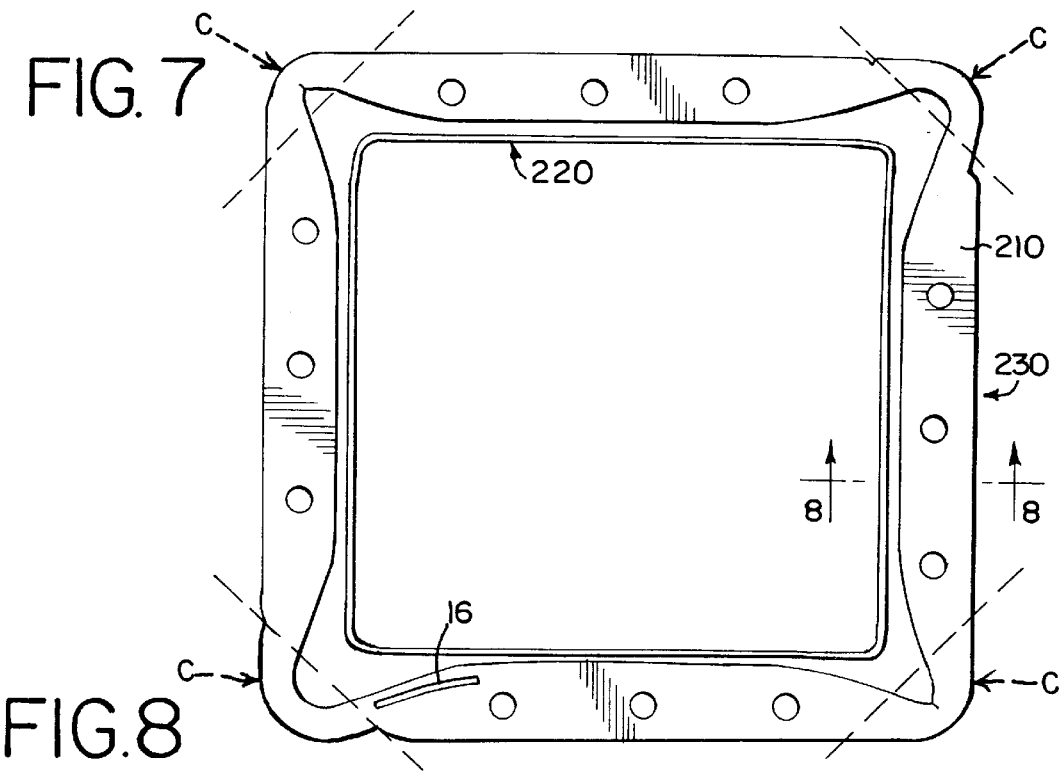
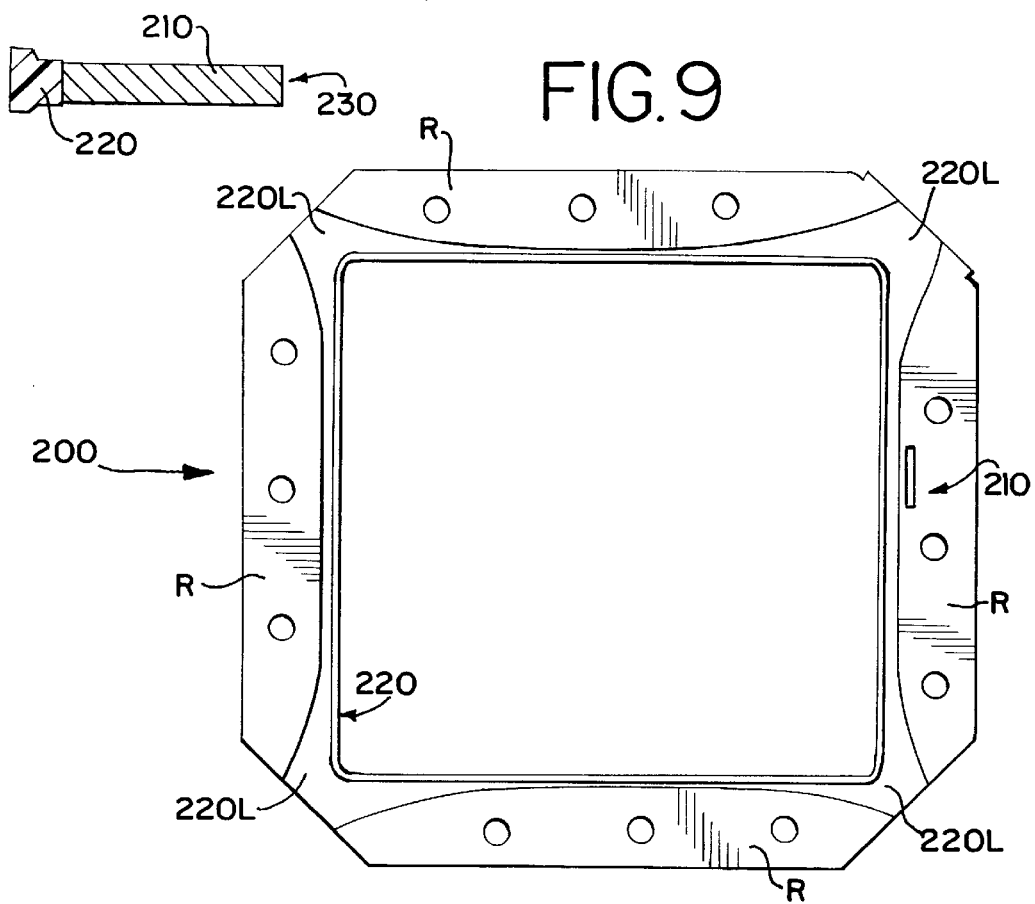

EXPANDABLE GASKET AND METHOD OF MAKING SAME

BACKGROUND OF THE INVENTION

Gasket bodies are frequently formed of a core or carrier with sealing aids of various types disposed thereon. Typically cores or carriers are made of metal and are stamped or otherwise formed from a blank sheet to provide a perimetric body of the final shape and size needed. The material which is removed to provide the typical perimetric gasket body becomes waste. With gaskets of a large size in plan view, the amount of waste can be very substantial.

One approach to minimizing such waste has been to form gasket sections which can be joined together to form a frame defining the perimetric gasket body. This is exemplified by patents such as U.S. Pat. Nos. 3,231,289 and 4,572,522. Gasket bodies of this type, require the formation of interlocking end configurations, and require assembly operations, as well as operations which assure, if possible, that the frame sections remain attached. This technique also requires multiple punch press tooling and increases storage and handling costs. Other approaches have been to slit a sheet of gasket material and to provide corners which connect gasket sections to allow them to freely pivot into predetermined gasket shapes. These are designed to allow the gasket to be moved between collapsed and operable positions a number of times and are exemplified by U.S. Pat. Nos. 5,161,808 and 3,583,711.

It would be desirable to provide a gasket core or carrier which is continuous, which is formed in one piece and which substantially reduces material waste, as well as one which lends itself to storage and shipment in a compact state, and to one which can be reshaped permanently into a final desired shape.

SUMMARY OF THE INVENTION

In accordance with the present invention, an improved method of making a continuous gasket body is provided. The method comprises the steps of forming a narrow, elongated flat strip of core material to provide an expandable continuous core blank having, in plan view, a plurality of closely adjacent core segments, and a plurality of spaced, elongated narrow deformable connecting zones, the core segments being wider in plan view than the connecting zones, each core segment being disposed between a pair of the narrow connecting zones, and spreading the core segments in the plane of the strip and permanently deforming and reshaping the connecting zones in a controlled manner to dispose the core segments in an open, predetermined annular shape, with the connecting zones serving as bridges between adjacent core segments.

The method desirably further comprises the steps of providing a tool, engaging surfaces of the core blank with the tool, and forcing those surfaces apart to spread the core segments and to permanently deform and reshape the connecting zones. The tool may employ a parallelogram linkage operable to spread the core segments.

The core segments may define openings and the method may further comprise the step of engaging the openings with a tool to facilitate the spreading.

Desirably the connecting zones define notches to assist in the controllable deformation and reshaping of the connecting zones. The method may further comprise the step of flattening the deformed reshaped connecting zones, as by press-flattening. The method may most desirably be used with metal core material which is stamped to form the core blank.

In a preferred form, the method of forming a gasket body comprises the steps of providing an elongated strip of sheet material, blanking the strip to form a core blank, the core blank having a pair of ends and a pair of side edges and defining, in plan view, a plurality of core segments, a plurality of elongated connecting elements connecting adjacent pairs of core segments, and a slot running from one of the ends to the other of the ends, the core segments being wider in plan view than the connecting elements, at least some of the core segments lying adjacent to each other on opposite sides of the slot and at least some of the connecting elements lying on opposite sides of the slot, and spreading the core segments away from the slot by permanently deforming the connecting elements until the core elements are disposed in a permanently altered predetermined open perimetric configuration in plan view.

An expandable gasket body in accordance with the present invention comprises of a narrow, elongated, generally flat strip of generally inelastic core material having a pair of spaced apart end edges and a pair of spaced apart side edges, a slot lengthwise of the strip between the side edges and extending to near each of the end edges, the end edges defining elongated shaped connecting zones of the core material of a reduced width in plan view, and at least two further elongated shaped zones of reduced width in plan view between the end edges, whereby when the body is expanded, the reduced width connecting zones deform and reshape permanently to form a continuous annular gasket body. Desirably the strip further defines a series of core segments, each core segment being spaced from and connected to a next adjacent core segment by a zone of core material which is of reduced width in plan view. The gasket body may define a plurality of openings therein and is preferably metal.

An inelastic metal gasket precursor in accordance with the present invention has a pair of ends, a pair of side edges and a slot between the side edges extending from adjacent one end to adjacent the other end of the precursor, the precursor further having a plurality of elongated core segments and a plurality of elongated connecting elements, some of each lying on each side of the slot, the core segments being wider in plan view than are the connecting elements, whereby the precursor can be controllably expanded by displacing the core segments about the connecting elements to permanently deform and reshape the connecting elements to form a gasket body having a permanently locked-in predetermined shape. The connecting elements most desirably define notches to facilitate controllable expansion and displacement of the core segments.

In accordance with yet another aspect of the present invention, a method is provided for making a semi-rigid gasket comprising the steps of forming a continuous gasket core of a rigid material, molding a continuous elastomeric seal having an elastomeric sealing bead to the core, and severing the core at a plurality of spaced locations by removing both spaced apart segments of the core and adjacent portions of the seal while leaving adjacent portions of the sealing bead and seal to hold the remaining core segments together. A semi-rigid gasket is also provided and comprises a plurality of elongated rigid side rails each having a pair of ends spaced from next adjacent elongated rigid side rails, and a short elastomeric bridge connecting each pair of adjacent side rail ends, and an elastomeric seal formed with the bridges and with the side rails and extending continuously adjacent a perimeter of the gasket, whereby the gasket is rigid at the side rails and flexible at the bridges.

Further objects, features and advantages of the present invention will become apparent from the following description and drawings.

BRIEF DESCRIPTION OF THE DRAWINGS

FIG. 1 is a plan view of a gasket core having a continuous perimeter made in accordance with the present invention;

FIG. 2 is a plan view of a precursor or blank from which the gasket core of FIG. 1 may be formed;

FIG. 7 is a plan view of a gasket precursor of the present invention with an edge-molded elastomeric seal;

FIG. 8 is a cross-sectional view taken along line 8—8 of FIG. 7;

FIG. 9 is a partially rigid gasket made from the precursor of FIG. 7;

DETAILED DESCRIPTION OF A PRESENTLY PREFERRED EMBODIMENT

Figure 3:
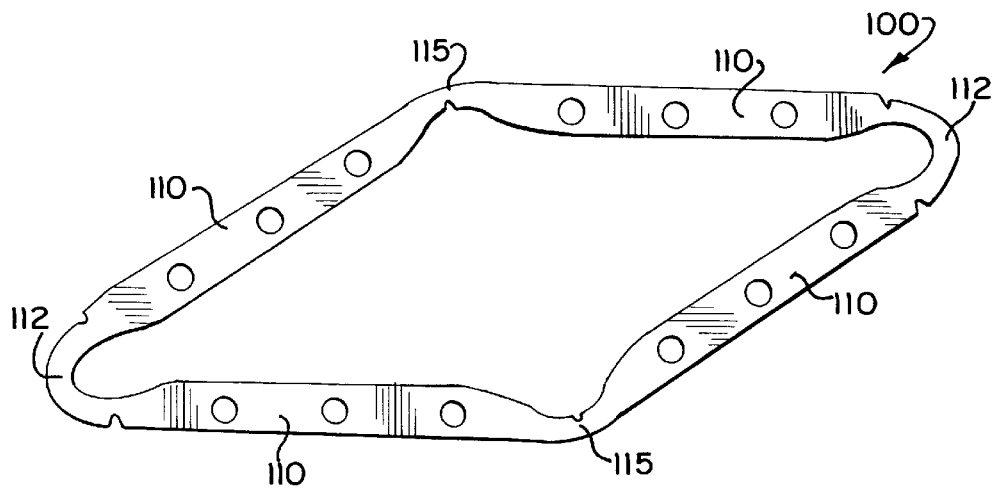
FIG. 3 illustrates the blank of FIG. 2 in a partially expanded state, a state which is intermediate the final and precursor shapes of FIGS. 1 and 2.

Referring now to the drawings, FIGS. 1–3 show a gasket 10 comprising a carrier or core 12. Core 12 may be provided with openings such as bolt holes 14 and sealing aids, such as coatings, beads or other known sealing aids. In the embodiment illustrated, the core 12 is of metal, such as carbon steel. Other metals may be used as well, as may other materials which will permanently retain their shape in plan view after expansion. The sealing aid in the embodiment illustrated is a silicone sealing bead 16 which is positioned to confront the flange of the member against which the gasket 10 is to seal.

As used herein, the terms core and carrier are used interchangeably in terms of the denomination of parts making up the blank or gasket precursor and the steps of expanding the precursor to form the desired annular or perimetric gasket body. Thus, whether the precursor is used as a core, the surfaces of which may be formed with facings, or used as a carrier for carrying sealing beads or the like, the principles of the present invention are equally applicable.

FIG. 2 illustrates a narrow, elongated flat precursor or blank 100 from which the gasket core 12 of FIG. 1 is adapted to be formed. Blank 100 comprises a shape formed from an elongated flat sheet or strip S (shown in dotted line) of core material. The strip S, in the embodiment shown, may be approximately 11 inches by 1.25 inches in plan view by about 0.035 inch thick. The strip S is stamped or otherwise blanked or formed into the elongated narrow blank shape shown in FIG. 2.

The blank 100 comprises a series of elongated core segments 110, in this case four such segments, and elongated bridges or connecting elements or zones 112, 114 and mid-region 115 of zones 114 connecting each core segment to the next adjacent core segment. The connecting zones 112 at the end edges of the blank 100 are generally U-shaped and include outside notches 120 adjoining the zone 112 and portions thereof merging with the core segments 110. Similarly, connecting zones 114 intermediate the end edges of the blank 100 are elongated, have a thinned mid-region 115 and include inside notches 122 in the mid-regions to facilitate reshaping of the blank 100 as will be described.

In plan view, the core segments 110 are relatively wide. On the other hand, the connecting zones 112, 114 and mid-regions 115 of zones 114 are deliberately made relatively narrower, and are considerably narrower in plan view than are the core segments 110. As may be seen, each core segment 110 is disposed between a pair of the connecting elements or zones, and, in plan view, the blank 100 is continuous through the core segments and connecting zones.

The material of the blank 100 is inelastic but is sufficiently ductile and the configuration of the narrow connecting zones, including their shapes, notch arrays and is points of connection to the core segments, are such that the blank may be permanently reshaped and transformed from the closed compact position in which it is stamped as the blank 100 to the position which the core 12 is designed to assume, namely from the closed position of FIG. 2 to the open, perimetric configuration of FIG. 1. In that position, it is rigid, resists collapse and is permanently reshaped.

As may be appreciated from FIG. 2, the narrow, elongated flat blank 100 is formed to be expandable into the continuous, permanently reshaped core 12. In the form of FIG. 2, the blank has a pair of ends or end edges at connecting zones 112 as well as a pair of generally parallel, spaced sides or side edges. A narrow slot 130 extends lengthwise of the blank and lies generally parallel to and equidistantly spaced from the side edges. The slot 130 opens to an increased width adjacent connecting zones 114 to help define the elongated, relatively narrower bridging or connecting zones 114 which are intermediate the end edges of the blank 100. As will be seen in FIG. 2, pairs of the core segments 110 lie closely adjacent to each other on opposite sides of the slot 130 thereby minimizing the space occupied by the blank 100 and the material used to form it from a strip S, hence to minimize waste. Further, as will also be seen in FIG. 2, some of each of the connecting zones and core elements lie on each side of the slot.

Figure 4:
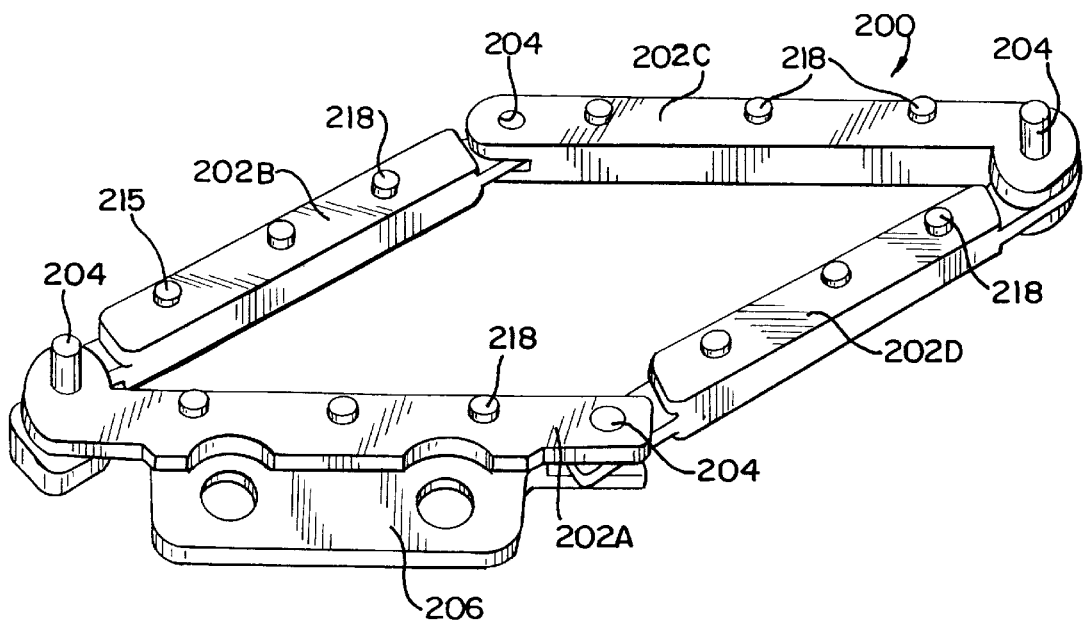
FIG. 4 is a plan view of a representative expander tool for expanding the blank of FIG. 2 to the final shape of FIG. 1.
Figure 5:
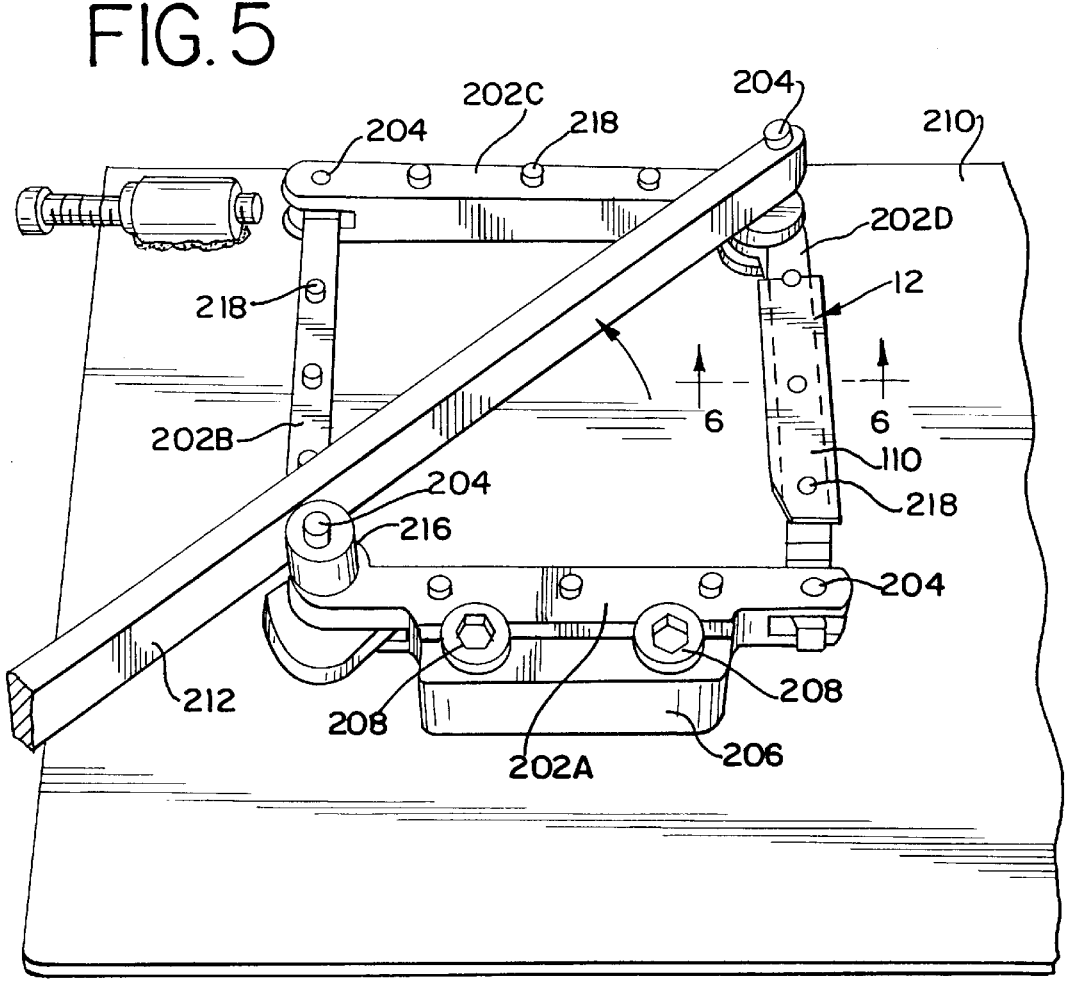
FIG. 5 is a view of the tool of FIG. 4 in a fully expanded state with a fragmentary core superimposed thereon.
Figure 6:
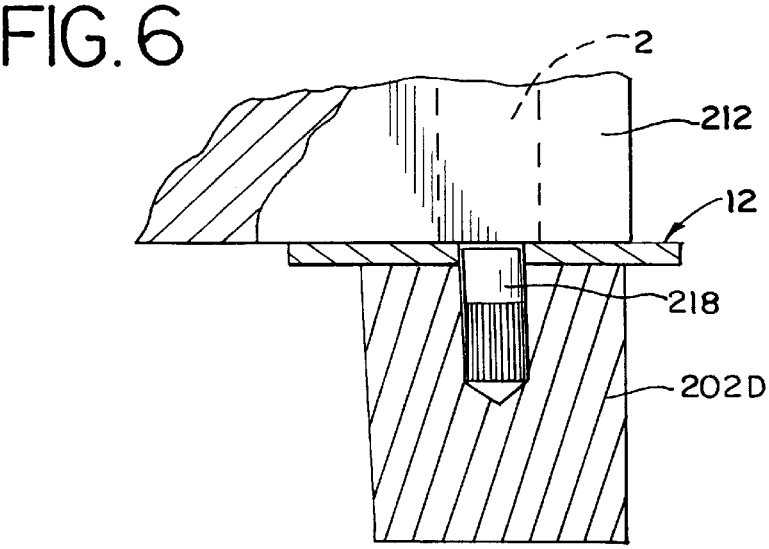
FIG. 6 is a sectional view taken along line 6—6 of FIG. 5.

To form the continuous gasket core 12 of FIG. 1, the blank 100 of FIG. 2 is expanded and permanently reshaped and deformed from the position and shape of FIG. 2. A typical tool for carrying this out is illustrated in FIG. 4. Because the core 12 is generally rectangular in shape in the illustrated embodiment, a tool based on a parallelogram linkage may be used. As such, tool 200 includes four links 202A, 202B, 202C, 202D which are pinned together at their respective ends by pins 204. Because the core 12 is essentially square, the pins 204 are positioned at points in the links which cause them to be of essentially equal lengths. One of the links, link 202A, is fitted with a keeper 206 which in turn is held by keeper pins 208 to a support plate 210. An operator rod 212 is adapted to operate about the extended link pin 204. A fulcrum pin 216 which may be provided on the diagonally opposite link pin 204 functions to cooperate with the operator rod 212.

When the blank 100 is in its initially formed condition, namely is in the position of FIG. 2, it is adapted to be juxtaposed with the expander tool 200 with surfaces of the blank confronting associated tool portions. To that end, the bolt holes 14 are positioned on spreader pins 218 thereby to firmly secure the blank to the links 202A–202D. The operator rod 212 then forces expander pin 214 to move and the associated links to open and spread the core segments 110 gradually from the closed, compact position of FIG. 2 progressively through intermediate stages as represented by FIG. 3 to the fully expanded position and shape of FIG. 1. As that occurs, the connecting zones 112, 114 permanently deform and change shape in a controlled manner to permit the connecting elements to be disposed in a permanently altered array, thereby to permit the core 12 to assume its permanent open, predetermined, generally square annular shape. As so formed, the permanently deformed connecting zones 112, 114 lock in the final shape. Zones 112, 114 and are sufficiently "plastic" during expansion to permit deformation, and to permit movement of the larger core segments 110, following which they permanently "lock-in" the final shape. That occurs as a result of having exceeded the elastic limit of the material forming the connecting elements. Thus, the precursor is permanently deformed and cannot return to its original shape. The final shape employs the connecting zones as bridges between adjacent core segments to form the continuous annular gasket body.

In some instances, the material used and the shapes and sizes of the parts of the blank 100 are such that the connecting zones may deform or warp out of the plane of the flat blank. In such cases it may be desirable to utilize a post-forming flattening step, such as press-flattening, thereby to return the entire core 12 to a desired flat coplanar condition.

The expanding operation may be a mechanical parallelogram or four bar linkage as illustrated, or may employ other expansion techniques. For example a mechanism having a network of force applying members for applying forces in selected directions for selected distances may be used and may be operated, such as hydraulically or pneumatically. The surfaces of the blank which are engaged by the tool could be inner edges or other portions of the blank, rather than the surfaces provided by the bolt holes 14. For complex shapes, multi-stage expansion techniques may be desirably employed.

In the embodiment illustrated, four core segments joined by connecting zones are shown. The final core may be square, as illustrated, or rectangular. It may be of a generally circular shape as well, employing four arcuate core segments joined in a blank by connecting zones which, when permanently deformed as described, will form a final, self-sustaining shape which is generally circular in plan view. In such a case, the blank will not be quite as compact as when straight core segments forming a rectilinear core are provided. Of course more than four core segments may be utilized with the commensurate number of connecting zones. For circular gaskets, increasing numbers of segments will permit a more compact blank, with less material wastage. Indeed a wide variety of final shapes can be obtained using combinations of slits, cutouts and holes with suitable tools to provide rectangular, circular and most gasket shapes, and with suitable gasket shapes in plan view.

Blanks formed in accordance with this invention may be stored and shipped, and expanded at a later time, either in a facility of the manufacturer, or in a customer's plant. After expansion, the blank may be modified, as by flattening in the connecting zones or elsewhere if necessary, or even by trimming. Sealing aids may be applied after forming. In some cases sealing aids may be applied prior to expansion, or even prior to blanking a strip S. Sealing aids may be molded beads, screen printed beads or other sealing means. Much of this will depend upon the amount of distortion encountered in the connecting zones during expansion, whether post expansion modification, such as press flattening, is required, and on the nature of the sealing aids themselves.

For example, with the core of FIG. 1, if an annular or perimetric rubber sealing bead B is desired on the surface, it may most desiredly be deposited after final formation of the core 10. If sealing is to be accomplished by an edge-molded bead on the inside surface of the core, then where the connecting zones are outside of the zone to be sealed, it may be necessary to provide, in part, an unsupported bead across the "opening" between adjacent connecting zones. Again, where the flat surfaces of the gasket 10 are positioned to seal against associated flange surfaces, the core surfaces may be provided with facings which are laminated or coated thereon, which are over-molded, or which are otherwise provided, thereby to provide the desired sealing effect, just as are gaskets made in accordance with conventional practice. Where the bridging zones are inside or outside of the sealing surface (inside or outside the flange to be sealed), press-flattening may not be necessary, although special techniques to form a continuous sealing bead or sealing aid may be necessary, such as filling the zone with rubber molded in place, molding an unsupported bead across the opening or mechanically fitting a span seal into the open zone, etc. In rare cases, it may even be desirable, after applying a sealing aid, to remove, as by blanking, connecting zones that are outside of the sealing surface.

Although the blank may most desirably be formed of metal, it may be formed of plastic, laminates of metal and rubber, or other materials which will expand to form a core as described and which will permanently retain its shape after expansion.

Cores and carriers made in accordance with the present invention reduce scrap and waste from core material, facings and sealing aids. Smaller molding presses and tooling systems can be used for processing compact, non-expanded cores, than for processing full sized stampings. Punch press sizes and their costs are reduced. Shipping and storage costs of core precursors (the blanks) are reduced as compared to full size stampings. Multiple parts and interlocking structures used previously to fabricate multi-part gaskets in an effort to reduce costs and the expenses attendant the assembly of such gaskets are not required. Permanent deformation resulting from exceeding the elastic limit of the connecting elements results in a core shape which is as rigid and stiff and as permanent as a core stamped in its final shape.

The present invention also contemplates a process for making a semi-rigid gasket. Thus, for example, a gasket 200 may be made from a blank. After the blank has been opened, as to the shape illustrated by FIG. 1, thereby to form a continuous gasket core 210, it is then provided with a continuous elastomeric seal, such as an edge-molded seal having an elastomeric sealing bead 220, as illustrated by FIG. 7, thereby to form a gasket precursor 230. Bead 220 projects above and below the core 210, as is illustrated by FIG. 8.

Thereafter the core is severed at a plurality of spaced locations, such as at corners C, by removing both spaced apart segments of the core 210, as well as adjacent portions of the seal while leaving adjacent portions of the sealing bead 220 and seal to hold the remaining core segments together. This leaves a partially rigid gasket 200 (FIG. 9). Gasket 200 comprises several metallic rigid side rails R, each which provides a continuous sealing bead 220. The side rails have ends which are spaced from next adjacent side rails, and which are joined by elastomeric bridges or links 220L which provide, inter alia, continuations of beads 220.

Figure 10:
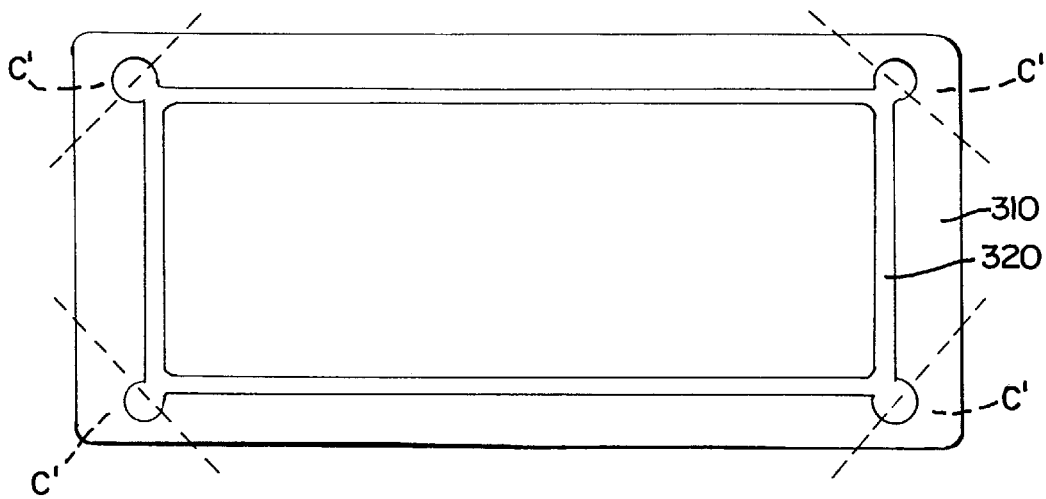
FIG. 10 is a further embodiment of a gasket precursor of the present invention.
Figure 11:
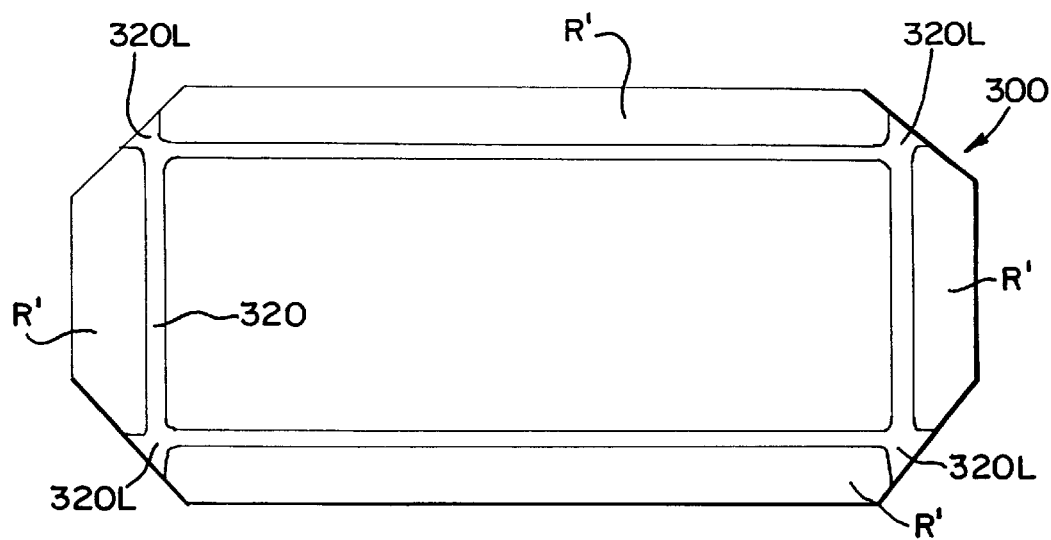
FIG. 11 is a partially rigid gasket made from the precursor of FIG. 10.

Although the embodiment of the partially rigid gasket 200 illustrated is based on the gasket precursor shown in FIG. 1, it is obvious that a wide variety of other configurations may be provided as well, including those which are formed from more conventionally formed cores, such as a preshaped stamped core, rather than those formed from a precursor of the type illustrated in FIG. 2. Thus, for example, a gasket precursor (FIG. 10) comprising a performed metal core 310 and an edge molded elastomeric bead 320 may be stamped to cut off connecting metal corners C' and to form a partially rigid gasket 300 (FIG. 11) joined by flexible elastomeric bridges 320L which provide, inter alia, continuations of beads 320 which hold the remaining rigid rail segments R together.

From the foregoing, it will be apparent that numerous modifications and variations can be effected without departing from the spirit and scope of the present invention. It will be appreciated that the present disclosure is intended as an exemplification of the invention, and is not intended to limit the invention to the specific embodiments illustrated and described. The claims are intended to cover all such modifications as fall within their scope.

What is claimed is:

1. A method of making a continuous gasket body comprising the steps of forming a narrow, elongated flat strip of core material to provide an expandable continuous core blank having, in plan view, a plurality of closely adjacent core segments, and a plurality of spaced, elongated narrow deformable connecting zones, said core segments being wider in plan view than said connecting zones, each said core segment being disposed between a pair of said narrow connecting zones, and spreading said core segments in the plane of said strip and permanently deforming and reshaping said connecting zones in a controlled manner to dispose said core segments in an open, predetermined shape, with said connecting zones serving as bridges between adjacent core segments, thereby to form a continuous annular gasket body.

2. The method of claim 1 and further comprising the step of providing openings in said core segments.

3. The method of claim 2, and further comprising the step of engaging said openings with a tool to facilitate said spreading.

4. The method of claim 1, and further comprising the steps of providing a tool, engaging surfaces of said core blank with said tool, and forcing said surfaces apart to spread said core segments and to permanently deform and reshape said connecting zones.

5. The method of claim 4, and wherein said tool comprises a parallelogram linkage operable to spread said core segments.

6. The method of claim 1 and wherein said connecting zones define notches to assist in the controllable deformation and reshaping of said connecting zones.

7. The method of claim 1, and further comprising the step of flattening the deformed reshaped connecting zones.

8. The method of claim 7, and wherein said flattening step comprises press-flattening said deformed reshaped connecting zones.

9. The method of claim 1, and further comprising the step of providing a sealing aid on said gasket body.

10. The method of claim 9, and wherein said steps of providing a sealing aid comprises applying a bead to said gasket body.

11. The method of claim 9 and wherein said step of providing a sealing aid comprises applying a sealing aid to said core bank prior to spreading said core segments.

12. The method of claim 1, and wherein said core material is metal.

13. The method of claim 12, and wherein said metal is stamped to form said core blank.

14. A method of forming a gasket body comprising the steps of (a) providing an elongated strip of sheet material, (b) blanking said strip to form a core blank, said core blank having a pair of ends and a pair of side edges and defining, in plan view, a plurality of core segments, a plurality of elongated connecting elements connecting adjacent pairs of core segments, and a slot running from one of said ends to the other of said ends, said core segments being wider in plan view than said connecting elements, at least some of said core segments lying adjacent to each other on opposite sides of said slot and at least some of said connecting elements lying on opposite sides of said slot, and (c) spreading said core segments away from said slot by permanently deforming said connecting elements until said core elements are disposed in a permanently altered predetermined open perimetric configuration in plan view.

15. The method of claim 14 and further comprising the step of providing openings in said core segments.

16. The method of claim 15, and further comprising the step of engaging said openings with a tool to facilitate said spreading.

17. The method of claim 14, and further comprising the steps of providing a tool, engaging surfaces of said core blank with said tool, and forcing said surfaces apart to spread said core segments and to deform and reshape said connecting elements.

18. The method of claim 17, and wherein said tool comprises a parallelogram linkage operable to spread said core segments.

19. The method of claim 14, and wherein said connecting zones define notches to assist in the controllable deformation and reshaping of said elongated connecting elements.

20. The method of claim 14, and further comprising the step of flattening the deformed reshaped connecting elements.

21. The method of claim 20, and wherein said flattening step comprises press-flattening said deformed reshaped connecting elements.

22. The method of claim 14, and further comprising the step of applying a sealing aid to said gasket body.

23. The method of claim 14, and wherein said blanking step comprises a stamping step.

24. The method of claim 23, and wherein said core blank is metal.

25. A method of making a semi-rigid gasket comprising the steps of:

(a) forming a continuous gasket core of a rigid material, (b) molding a continuous elastomeric seal having an elastomeric sealing bead to said core, and (c) removing a plurality of joining segments of said core and portions of said seal adjacent to said joining segments by severing said core at a plurality of spaced apart locations while leaving portions of said seal that are adjacent to remaining core segments to hold said remaining core segments together.

26. The method of claim 25, and wherein said forming step comprises forming a continuous gasket core of a rigid metal material.

27. The method of claim 25 wherein said step of forming comprises forming an integrally formed rectangular perimetric gasket core having a plurality of elongated side rails and end portions of intersecting pairs of said side rails, and wherein said severing comprises removing said end portions as well as adequate portions of said seal while leaving portions of said seal to hold said side rails together.

* * * * *